United States Patent [19]

Cosby

[11] Patent Number: 4,663,939
[45] Date of Patent: May 12, 1987

[54] CLOSED CYCLE EXTERNAL COMBUSTION ENGINE

[76] Inventor: Thomas L. Cosby, 1639 E. 84th Place, Chicago, Ill. 60617

[21] Appl. No.: 860,558

[22] Filed: May 7, 1986

[51] Int. Cl.⁴ .............................................. F02D 1/04
[52] U.S. Cl. ........................................ 60/650; 60/682
[58] Field of Search ................ 60/646, 648, 650, 657, 60/682

[56] References Cited

U.S. PATENT DOCUMENTS 2,453,928  11/1948  Oechslin ............................... 60/682
4,257,232   3/1981  Bell ....................................... 60/676

Primary Examiner—Stephen F. Husar
Attorney, Agent, or Firm—Michael G. Berkman

[57] ABSTRACT

An external combustion engine which utilizes an impulse or velocity compounded turbine in conjunction with a compressor to reduce input energy requirements while delivering an increased work output. The invention is characterized in the use, simultaneously, of cooling and compression, significantly to reduce the compression work requirement of current practices (which utilize interstage cooling between compression cycles). In accordance with the present invention the fluid is cooled in the compressor itself, during the compression cycle, and heat energy losses inherent in conventional cycles are reduced. The efficiency of the engine is increased significantly. An important feature of the invention is that phase change or transformation is eliminated, so that heat energy is conserved. In a second embodiment of the invention, the engine utilizes one or more impulse or velocity compounded turbines, and expansion is limited to a range in which compression is carried out with a minimization of parasitic losses. Any work sacrifice attributable to low pressure output portions of the cyclical operation is compensated for by a substantial salvage of the heat ordinarily dissipated and lost as waste in conventional cycles.

7 Claims, 6 Drawing Figures

SN = STATIONARY NOZZLE
MB = MOVING BLADE
SB = STATIONARY BLADE

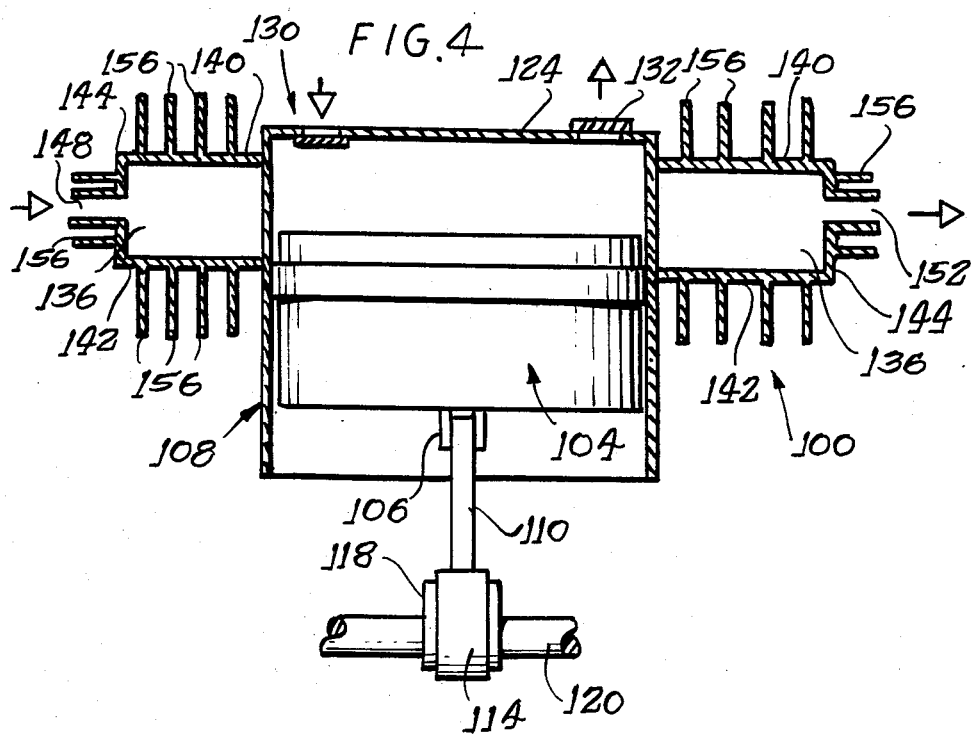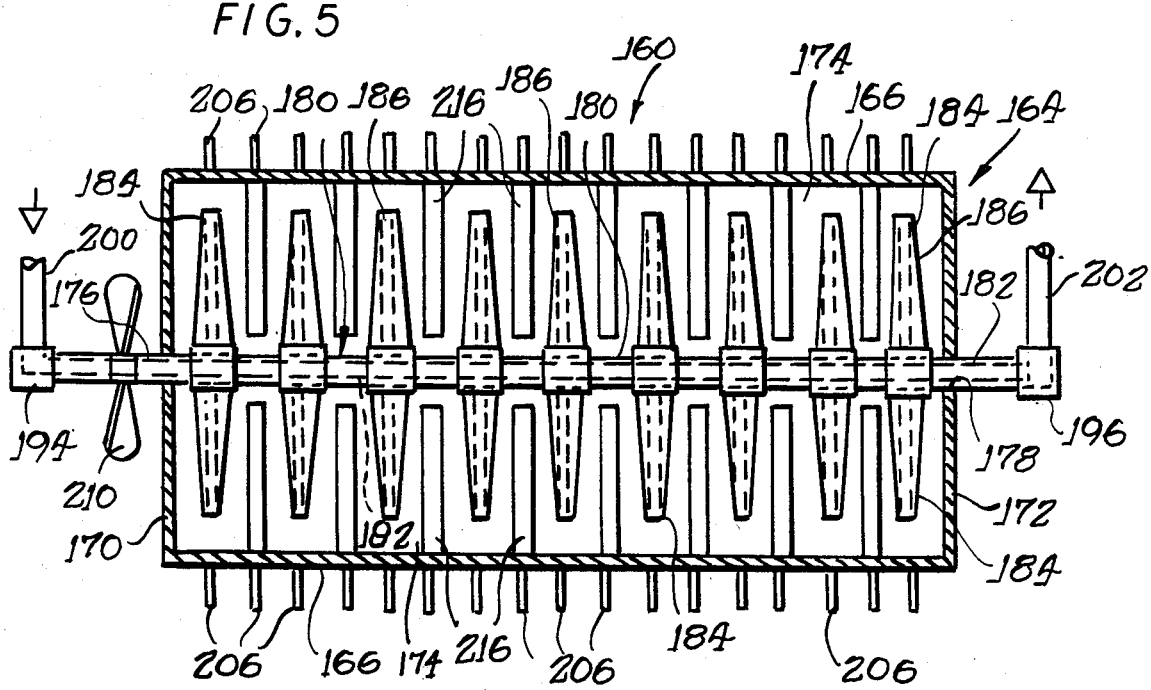

CLOSED CYCLE EXTERNAL COMBUSTION ENGINE

BACKGROUND OF THE INVENTION

The present invention relates to an improved cycle for a turbine-type engine. More particularly, the invention is directed to a method for operating a closed cycle external combustion engine of the impulse turbine type.

The process of the invention is an improvement over Applicant's prior U.S. Pat. No. 3,826,092, and the entire disclosure of that patent is hereby specifically incorporated herein by reference to the extent it is not inconsistent herewith. Utilization of the process taught herein makes possible the more economical generation of power and the more efficient use of fuel.

For the most part, prior art power generation systems utilize the basic Rankine Cycle or the Otto Cycle. The Rankine Cycle relies upon a phase transformation from water to vapor (steam) and, therefore, inherently suffers the loss or disposal of latent heat of vaporization rendering the cycle somewhat wasteful of phase-change energy. Water, which is used most often as the liquid phase, has an extremely high latent heat of vaporization in its transformation to a vapor.

By-passing this change or eliminating this phase transformation is not obviously more economical since thermodynamic principles indicate that the efficiency involved in such changes is a function of the change in enthalpy (Eff.=f(dH)). For the most part, the prior art has essentially overlooked or failed to deal directly with the phase transformation problem, at least in connection with common heat engine practice. However, in the context of turbine technology, the elimination of phase change is markedly more significant, and promises marked improvement in engine operation efficiency.

The Otto and Brayton Cycles of engine operation have some features in common with the novel cycle presented in the present invention. There are, however, important definable and ascertainable differences. Such differences are primarily a result of the kinetic energy due to the condensed mass flow of the vapors employed in the turbine engines. (See James B. Jones, and George A. Hawkins, *Engineering Thermodynamics* (New York, John Wiley & Sons, 1960), at page 567).

It is to invocation of the important and significant enhancement of turbine engine operating efficiency that the present invention is directed. Consistent with known and well established principles, the efficiency achieved through the practice of the present invention exceeds what has been found feasible in the prior art.

SUMMARY OF THE INVENTION

The improved engine-operating cycle which constitutes the substance of the present invention finds special application in multi-stage impulse turbines of the type known as velocity compound turbines. This particular type of engine (turbine) was selected because of the values of its operating parameters. That is, such turbines operate at high pressures, discharge at high pressures, and utilize low volumetric expansion. The use of multi-stage impulse turbines makes it possible, in the practice of the present invention, to convert the maximum amount of kinetic energy into work while, at the same time, maintaining the vapor at relatively high pressure and low volume.

It is a very important feature of the present invention that the relationship established, including high pressures and low volume changes, makes it possible to compress the operating vapor economically and to return the vapor to the heat exchanger as a vapor, without transformation through a liquid phase.

Another important feature of the present invention is the utilization, simultaneously, of cooling and compression. This novel innovation significantly reduces the compression work requirement of current practices which utilize interstage cooling, that is, cooling between compression stages.

In a preferred embodiment, the invention consists of the combination of a fuel generation/utilization sub-system with a power utilization sub-system. In the specific embodiment of the invention discussed herein, the fuel system has three primary components:

1. An electrolysis fuel generator where hydrogen and oxygen are produced from water.
2. A combustion-heat exchanger in which the gases are burned to yield heat and supply such heat to a heat exchanger, with water produced as a by-product.
3. A heat exchanger/Freon * vapor generator where the Freon vapor is pressurized.

* E. I. DuPont

Other and further features, advantages, and aims of the invention will be clear from the following description considered in conjunction with the drawings.

BRIEF DESCRIPTION OF THE DRAWINGS

FIG. 4 is a cross-sectional schematic representation of a compression piston assembly with a cooling jacket, according to the invention, for effecting cooling of the compressor during the compression cycle, simultaneously with the compression operation; and FIG. 5 is a cross-sectional view indicating schematically a mult-stage, rotary, centrifugal compressor embodiment of the invention complete with cooling facilities, for cooling the compressor during the compression operation.

DESCRIPTION OF THE PREFERRED EMBODIMENT

The aims and objects of the present invention are achieved by providing a unique cycle of operation for an impulse turbine. A critical feature of the cycle is that the efflux vapor from the turbine is maintained at a temperature to preclude condensation. This avoidance of transformation of the vapor to a liquid phase is followed throughout the subsequent compression and cooling cycles. As a result, the energy losses associated with phase changes are avoided, with resulting marked improvement in engine operating efficiency.

In a preferred embodiment of the invention, the power utilization system uses pressurized freon vapor to drive an impulse engine. The system itself is coupled to an intrastage or isothermally cooled compressor and power takeoff for the purpose of producing motive power, hydraulic power, electricity, etc. The compressed freon vapor is then returned to the heat exchanger. Condensation of the vapor to a liquid is avoided, to enhance the efficiency of the operation.

Figure 1:
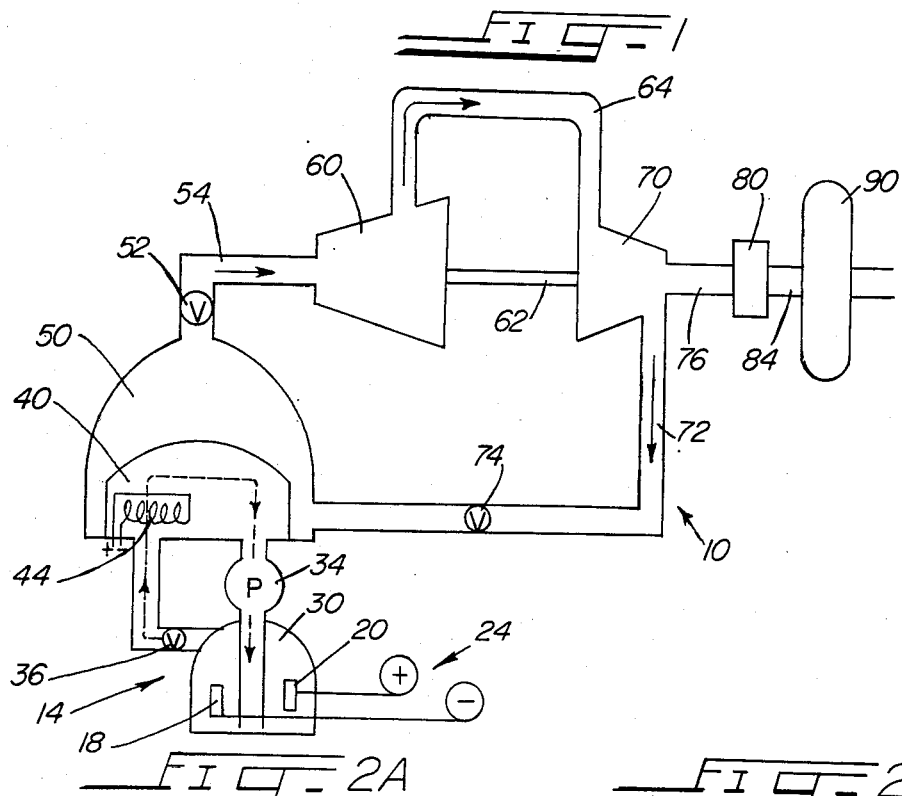
FIG. 1 is a schematic representation of the mode of operation of the combustion engine of the invention, with arrows denoting the direction of fluid flow.

Referring now more particularly to the drawings, FIG. 1 indicates schematically a system 10 embodying the inventive concepts of the present invention. The various cooperating structural elements of the system, shown schematically in FIG. 1, include fuel generating stage 14 in which a pair of electrodes 18 and 20, energized through an auxiliary electrical supply 24, electrolyze water in a vessel 30 to produce hydrogen and oxygen gas. These gases are delivered by means of a pump 34 through a valve 36 to a combustion chamber 40 which houses a coil 44. The coil 44 effects combustion of the fuel gases delivered from the fuel generation chamber 30.

The fuel combustion chamber 40 is enveloped, in heat exchange relationship, by a working fluid reservoir 50 which, in the preferred embodiment of the invention, contains Freon 21 as a working fluid. Heated pressurized gas (Freon) used in the fluid reservoir 50 is delivered through a valve 52 and a suitable conduit 54 to an impulse turbine 60. A drive rod 62 couples the turbine 60 to a compressor 70. The latter is fitted with cooling apparatus as indicated schematically in FIGS. 4 and 5.

In the exemplary embodiment of the invention described, the combustion chamber uses no outside air, and heat exchange is effected with the working Freon. The Freon itself operates at temperatures which are below the boiling point of water (the by-product of combustion in the combustion chamber 40) thus eliminating the need for outside air to cool steam produced in the combustion process.

After passage through the turbine 60, the spent Freon is delivered through a conduit 64 to a compressor 70 which is subjected to cooling during the compression cycle. Piping 72 returns the spent Freon through a check valve 74 to the working fluid reservoir 50 for reheating and recirculation.

Net work (turbine less compressor) is extracted by any of several conventional power take-off means via a clutch or other suitable device 80 connected by drive shafts 76 and 84 which are linked to the drive rod or turbine shaft 62.

Set forth herebelow are calculations indicating the turbine power output, the work, and the efficiency of the apparatus of the invention. As derived from accepted modes of calculation, it is shown herebelow that the potential efficiency of the engine of the present invention is in the range of about 68% under conditions in which the compressor is working with 50% cooling.

TABLE OF CALCULATIONS
FREON-21
Calculations:

| Temperature | Pressure | Enthalpy | Entropy | Vapor Volume |
|---|---|---|---|---|
| 180° F. | 110 psia | 140.49 | 0.2410 | 0.533 ft$^3$ |
| 124° F. | 60 psia | dH = $\frac{133.97}{6.52 \text{ BTU/lb}}$ | 0.2410 | 0.943 ft$^3$ |

Vapor Velocity at nozzle exit:

$v = 223.8 \sqrt{dH(6.52)} = 572$ ft/sec.

TABLE OF CALCULATIONS-continued
FREON-21
Calculations:

Impulse Turbine Blade Velocity**
$v = 0.23 \times 572$ ft/sec. $= 131.55$ ft/sec.
Turbine Power Output:[1]

$p = \frac{8 \times V^2}{550 \text{ g}} = 8 \times \frac{(131.55)^2}{550 \text{ g}} = 7.71$ HP $= 327$ BTU/min.

Compressor Work:
A.
$\frac{dH \times 60 \text{ lb/min}}{42.4 \text{ BTU/HP}} = \frac{6.52 \times 60}{42.4} = 9.23$ HP $= 391.2$ BTU/min.

B. Compressor Work with 50% cooling:
$W_c \times 0.50 = 391 \times 0.50 = 195$ BTU/min. $= 4.61$ HP
(compressor work is reduced significantly by cooling during compression)
Potential Net Work Available: Turbine Less Compressor
7.7 HP $-$ 4.61 HP $=$ 3.1 HP $=$ 131 BTU/min.
Heat Consumption:

$\frac{dH \times 60 \text{ lb Freon/min}}{2(\text{i.e., } 50\%)} = 195.6$ BTU.min.

Potential Efficiency: Network/Heat input $= 131.3/195.6 = 68.5\%$

**Elliott Multi-Valve Turbines, Bulletin H-37A, Carter Corp. 1976
[1]Encyclopedia Brittanica, Volume 22, page 347, 1967 Edition
[2]Trane Air-Conditioning Manual, Trane Co., LaCrosse, Wis., 1965

Figure 2A:
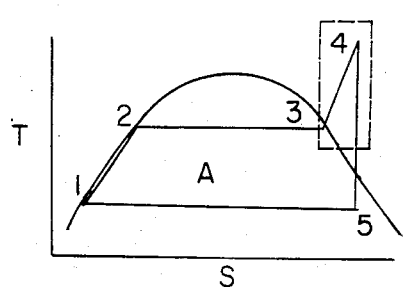
FIG. 2A is a diagrammatic representation of the operation of a standard Rankine Cycle engine.

Referring now to FIG. 2A, the operating cycle of a standard Rankine Engine is indicated schematically. As shown, the operation follows a temperature/entropy (t/s) curve as plotted (FIG. 2A) and shows the heating of water (1-2), the vaporization of the fluid (2-3), the superheating of the fluid (3-4), expansion of the gas generated (4-5), and the condensation of the steam to water (5-1).

Figure 2B:
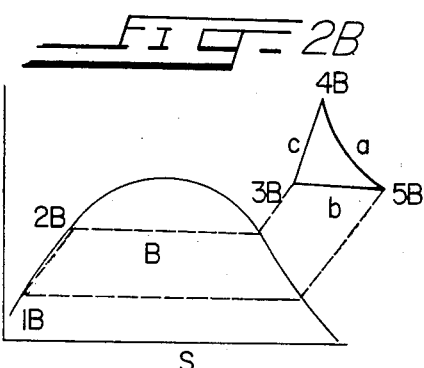
FIG. 2B is similar to FIG. 2A but shows additionally the triangular shaped cycle characterizing the novel cycle of the present invention.

Whereas FIG. 2A depicts the conventional cycle, the novel features of the cycle in accordance with the present invention are shown and distinguished schematically in FIG. 2B.

Shown in dotted lines, the modified cycle, as illustrated, indicates that once the cycle has utilized the "base" of the traditional Rankine Cycle, it then operates quite differently, traversing the base cycle only upon cessation of operation—once in, once out. This is done to reduce pressure when the system is not in operation. As indicated in FIG. 2B, the cycle is initiated, then moves from point 1B to point 4B via points 2B and 3B.

Once point 4B has been attained, the cycle continues to follow the triangularly shaped path shown in FIG. 2B. From point 4B expansion proceeds to point 5B along the leg designated a, where kinetic energy is generated and tansferred to the turbine 60. From point 5B to point 3B, compression and cooling occur simultaneously to prevent temperature or enthalpy increase. The latter situation would require compression work, equal to the change in enthalpy. Thus compressor work is reduced as estimated in the calculations set forth hereinabove at 50% cooling. From point 3B to 4B the Freon is reheated in the heat exchanger 50 and the cycle repeats.

Figure 3:
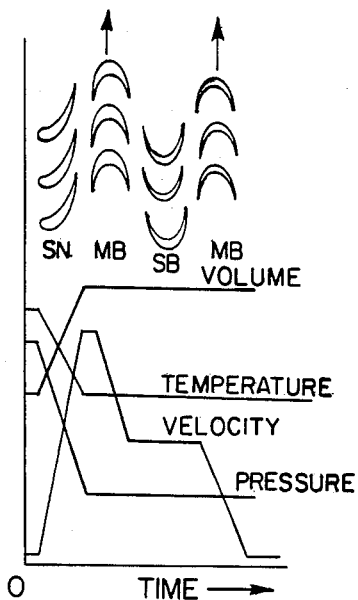
FIG. 3 is a graphic representation showing one acceleration and one volume change as such acceleration and change take place in accordance with the present invention.

FIG. 3 indicates diagrammatically the basis for the selection of the particular impulse cycle described for a Curtis stage velocity-compounded turbine. Curtis stage turbines are well known in the art, and a detailed description of the structure and operation of such turbines may be found in Keenan, Joseph P., "Thermodynamics", Wiley & Sons, 1941. The same text describes impulse-type turbines, in general. As shown, the chart shows that a single acceleration and a single volume change occur. That is, the kinetic energy is generated in one expansion and then converted to work by the turbine in two directional and two velocity changes. The vapor or steam is still at high temperature, pressure and enthalpy, but all the kinetic energy has been used from the expansion step.

A critical feature of the present invention, reflected in both the structure of the apparatus used and in the steps of the method employed, is that the compressor of the engine is itself cooled while the compression of the operational vapor system is being carried out.

Specifically, and as indicated schematically in FIGS. 4 and 5, the compressor used is provided with structures for facilitating the cooling of the compressor during its functional operation.

As shown in FIG. 4, the compressor 60 (indicated generally in FIG. 1) includes, in one embodiment of the invention, a piston-and-cylinder assembly 100 having a piston 104 operating reciprocally in a cylinder 108. The piston 104 is coupled 106 to a connecting rod 110 which is, in turn, attached 114 by means of a bearing assembly 118 to a crank shaft 120, in a manner well-known in the art.

A wall 124 surmounting the cylinder 108 is provided with an intake valve 130 and an exhaust valve 132, also in accordance with principles known in the art. Circumscribing the cylinder wall 124 of the cylinder 108 and in fluid flow heat exchange communication therewith is an annular, cylinder-cooling channel 136 having upper and lower walls 140 and 142 joined by a bridging lateral wall 144. The latter is provided with an inlet port 148 for ingress of a cooling fluid, and with a diametrically opposed discharge port 152 for exhausting the cooling fluid. Radiation or heat dissipation fins or ribs 156 are conductably connected to and extend normally of the walls 140, 142 and outwardly of the circumscribing wall 144 to enhance cooling during circulation of the compressor-cooling vapor through the cooling channel 136.

It is a critical feature of the method of the invention that the cooling of the compressor is conducted concurrently or simultaneously with the actual compression being effected in the piston-and-cylinder compression assembly 100.

In a second embodiment of the invention a multi-stage, rotary, centrifugal compressor is used. This is provided with cooling structures for facilitating operation in accordance with the principles of the present invention. As depicted schematically in FIG. 5, the rotary compressor 160 constitutes a generally cylindrical casing or housing 164 including a principal tubular wall 166 and opposed end walls 170 and 172 defining a chamber 174. Extending coaxially through the casing 164 and sleevedly supported 176 and 178 at opposed end walls 170 and 172 of the housing 164 is a rotatable hollow shaft 180 defining coaxial internal duct or passage 182. A plurality of lineally spaced blades 184 projecting radially outwardly of the shaft 180 are supported on the shaft 180 for rotation therewith.

The blades 184 are formed interiorly thereof with fluid passages 186 which are in fluid-flow communication with the internal fluid-conducting passage 182 in the shaft 180. Cooling fluid is introduced into and discharged from the assembly by means of fluid inlet and fluid outlet sleeves 194 and 196 and pipe stubs 200 and 202 connected at opposed ends of the hollow shaft 180.

Dissipation of compressor-derived heat is facilitated by means of ribs or fins 206 attached to and projecting radially outwardly of the tubular wall 166 of the compressor housing 164. A fan blade 210 secured on the rotating shaft 180 further effectuates and enhances heat dissipation.

The multi-stage, rotary, centrifugal compressor 160 includes a series of fixed disc-like blades 216 fastened to the cylindrical wall 166 interiorly thereof and projecting radially inwardly toward the central shaft 180. As shown, the fixed blades 216 are interposed between adjacent, sequential rotatable blades 184 of the lineally extending array of turbine elements.

The cycle of the present invention is characterized by extraordinary high efficiency, as completely non-polluting and as being independent of finite resources. A practical feature of the invention is that the apparatus may be assembled, for the most part, utilizing "off shelf" components which are currently available.

While the invention has been described with reference to a preferred embodiment, it will be appreciated by those skilled in the art that changes and substitutions in apparatus and precise parameters of operation without departing from the spirit and scope of the invention as defined in the appended claims.

What is claimed is:

1. In a process for the conversion of heat into work, an improved cycle for an external combustion engine including a heater, a turbine, and a compressor, said cycle comprising the steps of:
   (a) heating a liquid heat transfer fluid under pressure to provide a pressurized vapor,
   (b) expanding said pressurized vapor in functional flow communication with an impulse turbine to perform work and to provide a turbine-spent efflux vapor,
   (c) maintaining the efflux vapor from the impulse turbine at a pressure reduced to approximately ½ of a pressure of the pressurized vapor as introduced functionally into the impulse turbine, and
   (d) maintaining the temperature of the vapor in the engine at a level to preclude condensation of the vapor,
   (e) releasing efflux vapor from the impulse turbine, into a compressor,
   (f) compressing in the compressor the efflux vapor released from the impulse turbine, and simultaneously cooling the efflux vapor in the same compressor while maintaining the efflux vapor as a gaseous phase,
   (g) reheating the compressed efflux vapor to provide a superheated vapor,
   (h) directing the superheated vapor through the impulse turbine to perform work, and
   (i) repeating process steps (c) through (h) including repeatedly recycling vapor through the impulse turbine while obviating transition of the vapor through a liquid phase throughout the duration of the operating cycle.

2. The process as set forth in claim 1 wherein simultaneous compression and cooling are carried out in the compressor isothermally.

3. The process as set forth in claim 1 wherein the heating of the liquid heat transfer fluid is effected through the steps of electrolyzing water to produce hydrogen and oxygen gases, and burning the gases to produce heat.

4. The process as set forth in claim 1 wherein the impulse turbine is a multi-stage impulse turbine, and wherein during a final stage exhaust of the multi-stage impulse turbine, the turbine is operated at a value and under conditions such that the ratio of the final stage exhaust pressure to the stage input pressure is approximately 1:2.

5. The process as set forth in claim 4 wherein said turbine is a velocity compounded stage turbine, and wherein the pressurized efflux vapor is expanded and utilized through the velocity compounded stage turbine.

6. The method as set forth in claim 5 wherein the velocity compounded stage turbine is a Curtis type turbine.

7. The method as set forth in claim 1 wherein the turbine is a multi-stage turbine comprising, in combination, a Curtis velocity-compounded type turbine and an impulse turbine.

* * * * *